US012791997B2

(12) United States Patent
Fast

(10) Patent No.: US 12,791,997 B2
(45) Date of Patent: Nov. 10, 2026

(54) CONTROL AND/OR DATA TRANSMISSION SYSTEM

(71) Applicant: Phoenix Contact GmbH & Co. KG, Blomberg (DE)

(72) Inventor: Arno Martin Fast, Lage (DE)

(73) Assignee: Phoenix Contact GmbH & Co. KG, Blomberg (DE)

( * ) Notice: Subject to any disclaimer, the term of this patent is extended or adjusted under 35 U.S.C. 154(b) by 266 days.

(21) Appl. No.: 18/834,276

(22) PCT Filed: Feb. 2, 2023

(86) PCT No.: PCT/EP2023/052536

§ 371 (c)(1),
(2) Date: Jul. 30, 2024

(87) PCT Pub. No.: WO2023/148257

PCT Pub. Date: Aug. 10, 2023

(65) Prior Publication Data

US 2025/0155865 A1 May 15, 2025

(30) Foreign Application Priority Data

Feb. 2, 2022 (LU) ........................................ 102906

(51) Int. Cl.
*B25J 9/16* (2006.01)
*G05B 19/05* (2006.01)
(Continued)

(52) U.S. Cl.
CPC ............. *G05B 19/05* (2013.01); *G06F 3/162* (2013.01); *H04N 7/04* (2013.01); *B25J 9/1694* (2013.01);
(Continued)

(58) Field of Classification Search
CPC ........... G05B 19/05; G05B 2219/13135; B25J 9/1694; G06N 3/02
See application file for complete search history.

(56) References Cited

U.S. PATENT DOCUMENTS

2008/0155135 A1* 6/2008 Garg ..................... G06F 13/126 712/34
2019/0098035 A1 3/2019 Periaswamy et al.
(Continued)

FOREIGN PATENT DOCUMENTS

CN 109459990 A 3/2019
CN 109614946 A 4/2019
(Continued)

OTHER PUBLICATIONS

Authorized Officer: Heiner, Christoph, International Search Report issued in PCT Application No. PCT/EP2023/052536, May 2, 2023, 2 pp.

*Primary Examiner* — Mark A Connolly
(74) *Attorney, Agent, or Firm* — Kaplan Breyer Schwarz, LLP

(57) ABSTRACT

A control and/or data transmission system for performing complex and elaborate calculations, includes at least one external data processing device directly connected to the control device. The outsourced calculations are performed by the external data processing device using a software module based on a trained artificial neural network. The results are then transmitted directly to the control device without any detours. For this purpose, the external data processing device is connected to the control device via a direct connection, i.e. a point-to-point connection. The AI-based software module preferably processes audio and/or video signals as input signals, which are transmitted from an
(Continued)

external input device to the control device and from there to the external data processing device.

13 Claims, 2 Drawing Sheets

(51) Int. Cl.
*G06F 3/16* (2006.01)
*G06N 3/02* (2006.01)
*H04N 7/04* (2006.01)

(52) U.S. Cl.
CPC .............. *G05B 2219/13135* (2013.01); *G05B 2219/15023* (2013.01); *G05B 2219/25255* (2013.01)

(56) References Cited

U.S. PATENT DOCUMENTS

| | | | | |
|---|---|---|---|---|
| 2022/0019200 | A1* | 1/2022 | Drews | G05B 19/41835 |
| 2022/0021917 | A1* | 1/2022 | Zou | G06F 11/3495 |
| 2023/0043075 | A1* | 2/2023 | Watanabe | H04N 7/183 |

FOREIGN PATENT DOCUMENTS

| | | | |
|---|---|---|---|
| CN | 110333689 | A | 10/2019 |
| CN | 210181466 | U | 3/2020 |
| CN | 113140229 | A | 7/2021 |
| CN | 113209679 | A | 8/2021 |
| EP | 1420316 | B1 | 5/2012 |
| KR | 10-2131716 | B1 | 7/2020 |
| WO | 2020/222845 | A1 | 11/2020 |

* cited by examiner

CONTROL AND/OR DATA TRANSMISSION SYSTEM

FIELD

The invention relates to a control and/or data transmission system, which can be used in particular in an industrial automation environment.

BACKGROUND

A core component of an industrial automation system is a programmable logic controller (PLC). Such a PLC usually processes input signals from sensors of the automation system and generates output signals that are transferred to actuators for the control and/or regulation of a technical automation process. The monitoring, regulation and control of technical processes often takes place in real time and can require quite complex and complicated calculations of the process input data.

SUMMARY

It is an object of the present invention to create a control and/or data transmission system which can perform high and complex computing work efficiently and, if necessary, also in real time.

A core idea of the invention can be seen in having complex and elaborate calculations performed not or not alone by a control device, but by at least one external data processing device directly connected to the control device, whereby the outsourced calculations are performed by the external data processing device by executing a software module based on a trained artificial neural network, hereinafter also referred to as AI-based software module for short, and the results are then transmitted directly to the control device without detours. The external data processing device is connected to the control unit via a direct connection, i.e. a point-to-point connection. The AI-based software module preferably processes audio and/or video signals as input signals, which are transmitted from an external input device to the control device and from there to the external data processing device.

The above-mentioned technical problem is solved by the features of claim 1. Advantageous further embodiments are the subject of the dependent claims.

Accordingly, a control and/or data transmission system is created which can have the following features:—

- a control device which has a memory device in which at least one control program is stored, and a control unit which is connected to the memory device and which is configured to execute the control program,
  - a first external input device which can be connected to the control device and is configured to transmit audio and/or video signals to the control device, the control device being configured to receive audio and/or video signals from the first external input device, and
  - a first external data processing device which has a control unit and a memory device connected to the control unit, wherein a first software module based on a trained artificial neural network is stored in the memory device, the first software module being configured to process input signals which contain audio and/or video signals, wherein the first external data processing device and the control device are connectable to each other by means of a first direct connection, wherein
- the control unit of the control device is configured to cause the control device to send the audio and/or video signals received from the first external input device to the first external data processing device using a communication protocol, the communication protocol including a protocol for continuous transmission of audio and/or video signals, the first external data processing device being configured to receive the audio and/or video signals transmitted by the control device according to the communication protocol, wherein
- the control unit of the first external data processing device is configured to process the audio and/or video signals received from the control device into output signals while executing the first software module and to cause the first external data processing device to transmit the output signals to the control device, and wherein the control device is configured to receive the output signals transmitted by the first external data processing device and to transfer them to the control program.

Preferably, the first input device contains a video camera and/or a microphone.

The control device preferably has at least one communication interface that is configured to receive audio and/or video signals from the first external input device. The communication interface can be implemented as a hardware and/or software component. The hardware component can have a connection socket.

Advantageously, the communication protocol comprises the Real-Time Streaming Protocol (RTSP), which defines the control of the transmission of audio and/or video signals. The communication protocol can be configured as a protocol stack, which can also contain, for example, the Real-Time Transport Protocol (RTP), which defines the continuous transmission of audio and/or video signals.

According to an advantageous further development, the control and/or data transmission system can have a second external input device that can be connected to the control device and is configured to transmit sensor signals to the control device. The control device can be configured to receive sensor signals from the second external input device, in particular via the communication interface or another communication interface. For this purpose, the control unit of the control device can be configured to cause the control device to send the sensor signals received from the second external input device to the first external data processing device, whereby the first external data processing device can be configured to receive the sensor signals sent by the control device. The first software module stored in the first external data processing device is configured to process input signals containing audio and/or video signals and sensor signals. The control unit of the first external data processing device can be configured to process the audio and/or video signals received from the control device together with the sensor signals into output signals while executing the first software module, and to cause the first external data processing device to transmit the output signals to the control device. The control device can be configured to receive the output signals sent by the first external data processing device and transfer them to the control program.

The second input device can preferably be configured as a measurement sensor, in particular as a pressure, vibration, temperature or humidity sensor.

In order to extend the range of use and the flexibility of the control and/or data transmission system, a third external input device that can be connected to the control device and is configured to transmit audio and/or video signals to the control device can be provided. If necessary, the third input device can also transmit sensor signals, which are not audio and/or video signals, to the control device. Preferably, the third input device is configured as a video camera, a microphone or a video camera with integrated microphone. The control device can be configured to receive audio and/or video signals from the third external input device, preferably via the communication interface or another communication interface. Furthermore, a second external data processing device may be provided, which has a control unit and a memory device connected to the control unit, wherein a second software module based on a trained artificial neural network is stored in the memory, wherein the second software module is configured to process input signals containing audio and/or video signals. The second external data processing device and the control device can be connected to each other by means of a second direct connection.

The control unit of the control device may be configured to cause the control device to selectively send the audio and/or video signals received from the third external input device to the second external data processing device using a communication protocol and the audio and/or video signals received from the first external input device to the first external data processing device using a communication protocol, wherein the communication protocols may comprise a protocol for continuous transmission of audio and/or video signals. The second external data processing device may be configured to receive the audio and/or video signals of the third external input device sent by the control device according to the communication protocol. The control unit of the second external data processing device may be configured to process the audio and/or video signals received from the control device into output signals by executing the second software module and to cause the second external data processing device to transmit the output signals to the control device. The control device can also be configured to receive the output signals sent by the second external data processing device and to transfer them to the control program or to another control program stored in the memory device of the control device. In particular, the control device can be configured to use the output signals received from the first data processing device to control a first technical process or sub-process and the output signals received from the second data processing device to control a second technical process or sub-process.

In order to extend the range of use and the flexibility of the control and/or data transmission system, preferably in an alternative manner, the control and/or data transmission system can have a third external input device that can be connected to the control device and is configured to transmit audio and/or video signals to the control device. If necessary, the third input device can also transmit sensor signals that are not audio and/or video signals to the control device. The control device can be configured to receive audio and/or video signals from the third external input device. A third software module based on a trained artificial neural network, which is configured to process input signals containing audio and/or video signals, can be stored in the first external data processing device. The control unit can be configured to specifically assign the audio and/or video signals received from the third external input device to the third software module stored in the first external data processing device and to specifically assign the audio and/or video signals received from the first external input device to the first software module stored in the first external data processing device. The control unit of the control device may be configured to cause the control device to send the audio and/or video signals received from the first and third external input devices to the first external data processing device using a communication protocol, wherein the communication protocol includes a protocol for continuous transmission of audio and/or video signals. The control unit of the first external data processing device can be configured to i) transfer the audio and/or video signals received by the control device and originating from the fourth external input device to the third software module as input signals and the audio and/or video signals received by the control device and originating from the first external input device to the first software module as input signals, ii) process the respective input signals into first and second output signals while executing the first and third software modules, and iii) to cause the first external data processing device to transmit the first and second output signals of the first and third software modules to the control device, and wherein the control device is configured to receive the first and second output signals of the first and third software modules, respectively, sent by the first external data processing device and to transfer them to the control program or another control program stored in the memory device of the control device. In particular, the control device can be configured to use the first output signals received from the first data processing device to control a first technical process or sub-process and the second output signals received from the first data processing device to control a second technical process or sub-process.

In order to be able to collect, observe, evaluate and/or use the output signals provided by the first external data processing device, preferably centrally, for optimizing the first or third software module, the control and/or data transmission system can have a higher-level computing and/or data storage system which can be connected to the control device. In this case, the control device can be configured to send output signals, which it has received from the first data processing device, to the higher-level computing and/or data storage system.

In order to also be able to collect, observe, evaluate and/or use the output signals provided by the second external data processing device, preferably centrally, for optimizing the second software module, the control device can be configured to send output signals that it has received from the second data processing device to the higher-level computing and/or data storage system.

Preferably, the higher-level computing and/or data storage system is implemented as a cloud-based system.

According to an advantageous design, at least one external output device that can be connected to the control device can be provided, which can act as an actuator. The control device can be configured to control the external output device as a function of the output signals received from the first external data processing device and by executing the stored control program.

An effective and at least partially automated configuration of the control and/or data transmission system can be achieved in that the control device can be configured to receive a software module based on a trained artificial neural network from an external computer connectable to the control device, wherein the software module is configured to process input signals containing audio and/or video signals and can be stored in the external computer, and to send the received software module to the first external data processing device.

Preferably, the control device can be a programmable logic controller (PLC) or an industrial PC.

According to an advantageous embodiment, the control and/or data transmission system can be an industrial automation system.

Expediently, the control unit of the control device can be configured to cause the control device to monitor and/or control and/or regulate at least one technical process while executing the at least one control program and depending on the output signals received from the first and/or second data processing device.

The control program can have several program modules, each of which is assigned to different control applications for controlling and/or monitoring and/or regulating at least one technical process or sub-process.

BRIEF DESCRIPTION OF THE DRAWINGS

The invention is illustrated in more detail below with reference to a number of embodiments in conjunction with the accompanying drawings. They show.

DETAILED DESCRIPTION

Figure 1:
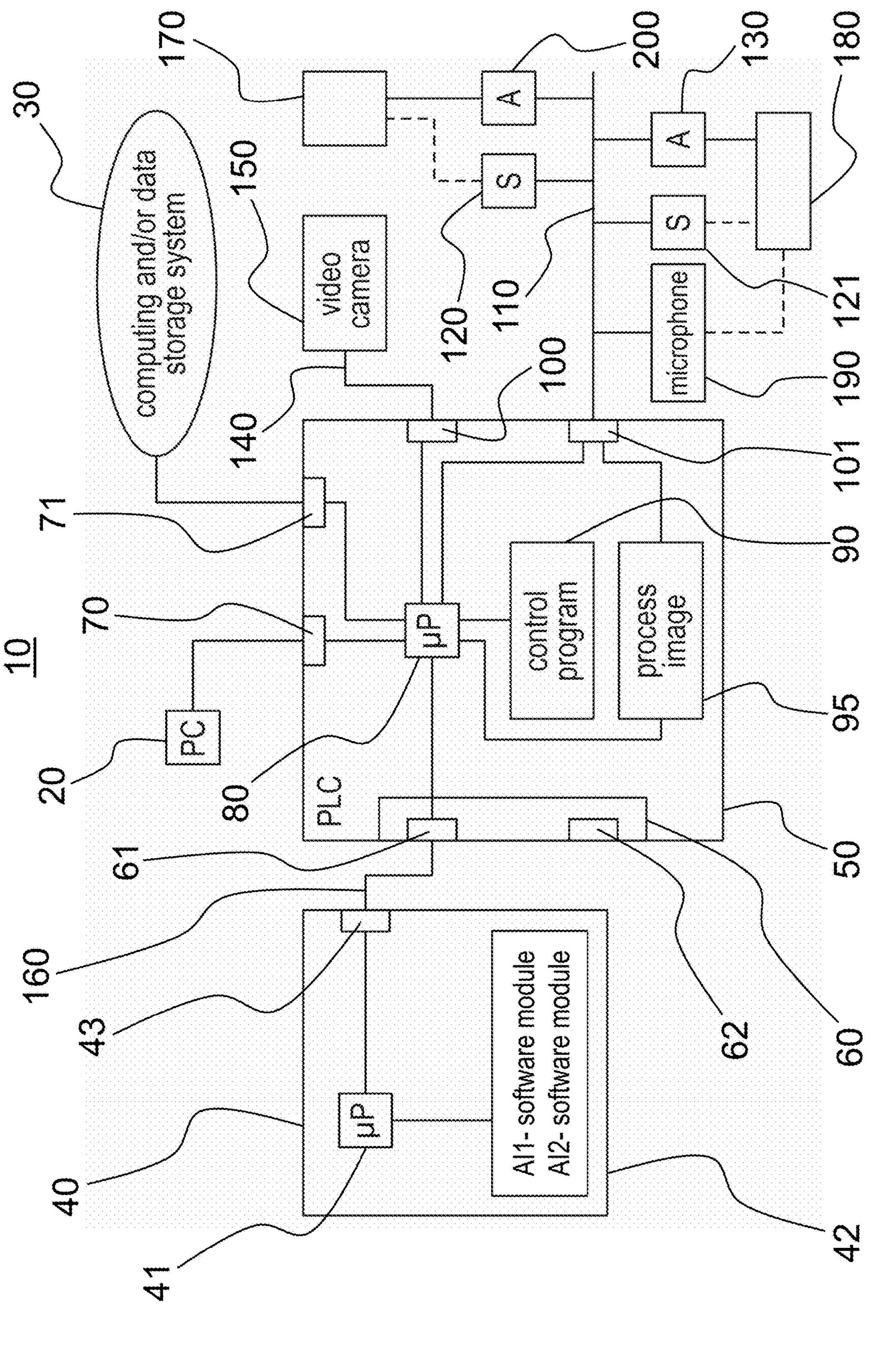
FIG. 1 an exemplary control and/or data transmission system comprising a PLC and an external data processing device directly connected to the PLC.

FIG. 1 shows an exemplary control and/or data transmission system 10, which can be configured, for example, as an industrial automation system for monitoring and/or regulating and/or controlling at least one technical process or sub-process. A technical process can be, for example, a manufacturing or process procedure The control and/or data transmission system 10 comprises, for example, a control device 50, which can preferably be configured as a programmable logic controller PLC or as an industrial PC. The exemplary PLC 50 can be configured in particular for process monitoring and process control of an industrial process.

The control device 50 preferably comprises at least one memory device 90, in which, for example, at least one control program can be stored. The control program can have several program modules, each of which is assigned to different control applications for controlling and/or monitoring and/or regulating at least one technical process or at least one sub-process. The control program can be part of a real-time operating system and be called up by it. The real-time operating system can also be stored in the memory device 90 or in a separate memory.

A control unit 80 is connected to the memory device 90, which is preferably configured to cause the control device 50 to monitor and control a technical process or at least a sub-process, for example the operation of a production machine, with the aid of input devices and output devices while executing the control program. An input device may include, for example, a video camera, a mic rophone, a video camera with integrated microphone and/or a sensor, in particular a measurement sensor that does not provide audio and/or video signals. An output device is preferably an actuator, such as a relay, drive or valve. The control unit 80 can, for example, be configured as a microprocessor or microcontroller.

Depending on the implementation, the process image of a process or sub-process to be monitored and controlled can be stored in the control device 50. A process image generally contains input data from sensors, in particular measurement data, and output data for actuators. A process image can also be stored in the memory device 90 or in a separate memory device 95. The control unit 80 is preferably configured to retrieve input data from sensors and store it as part of a process image for further use. Furthermore, the control unit 80 in particular ensures that output data for controlling actuators is stored as part of a process image and that the output data is transmitted to the respective actuators.

The exemplary control and/or data transmission system 10 has a first external input device 150, which can be connected to the control device 50 and is configured to transmit audio and/or video signals to the control device 50. The audio and/or video signals can, for example, be transmitted from the input device 150 to the control device 50 using the RTSP (Real-Time Streaming Protocol). In the exemplary system 10, the input device 150 has, for example, a video camera, which can be connected directly to a communication interface 100 of the PLC 50 via an electrical cable 140. The input device 150 is configured in particular to optically record the products, e.g. screws, produced by a production machine 170 during a production process and to transmit corresponding video signals to the control device 50. It should already be noted that the control device 50 can use the video signals to monitor the quality of the screws. It is also conceivable that the input device 150 contains a video camera with an integrated microphone and can therefore record not only images of the manufactured products, but also sounds from the manufacturing machine 170 and transmit these as audio signals to the control device 50 or to the communication interface 100.

The exemplary control and/or data transmission system 10 preferably also has a first external data processing device 40, which has a control unit 41 and a memory device 42 connected to the control unit 41. Preferably, the control unit 41 is configured as a microcontroller or microprocessor. The first external data processing device 40 and the control device 50 can be connected to each other by means of a first direct connection 160. For this purpose, the first external data processing device 40 and the control device 50 can each have a communication interface 60 or 43, which can each be configured in accordance with the PCI Express standard. In this way, a point-to-point connection can be established between the first external data processing device 40 and the control device 50. It should be noted at this point that the communication interface 60, for example configured as a PCI Express interface, can have several so-called lanes or connection points, each of which terminates a direct connection, for example the direct connection 160. The direct connection 160 can, for example, comprise a multi-core cable. FIG. 1 shows, for example, two connection points 61 and 62 of the communication interface 60.

In the memory device 42 of the data processing device 40, a first software module AI1 based on a trained artificial neural network is preferably stored as a tflite (Tensorflow Lite) file, which is configured to process input signals containing audio and/or video signals. According to an exemplary implementation, the neural network of the software module AI1 has been previously trained, for example, to recognize screws produced by the manufacturing machine 170 and recorded by the video camera 150.

The AI-based software module AI1 can, for example, be created in an external computer 20 and then transferred to the control device 50 as a tflite file via a communication interface 70. The control device 50 can in turn be configured to transfer the AI-based software module AI1 or the corresponding tflite file to the first data processing device 40, which then stores the AI-based software module AI1 or the corresponding tflite file in the storage device 42.

The control unit 80 of the control device 50 is preferably configured to cause the control device 50 to send the video signals received from the first external input device 150 and, if applicable, received audio signals to the first external data processing device using a communication protocol, wherein the communication protocol includes a protocol for continuous transmission of audio and/or video signals. The communication protocol may be in the form of a protocol stack and may include, for example, the Real-Time Streaming Protocol (RTSP) and the Real-Time Transport Protocol (RTP). The communication protocol may conventionally be implemented as a hardware and/or software component in the control device 50 and in the first data processing device 40. In this way, the control device 50 can transmit the video signals provided by the video camera of the input device 150 preferably as a digital continuous data stream in a plurality of packets to the data processing device 40 via the direct connection 160. The first external data processing device 40 is configured to receive the video signals of the input device 170 sent by the control device 50 in accordance with the communication protocol and, if applicable, also the audio signals of the input device 170 sent in accordance with the communication protocol. The control unit 41 of the first external data processing device 40 is configured to transmit the video signals received from the control device 50 and, if applicable, the audio signals received to the software module AI1 as input signals and, while executing the first software module AI1, to process the input signals into output signals and to cause the first external data processing device 40 to transmit the output signals to the control device 50. The way in which the output signals are transmitted and the data structure of the output signals to be used depends, among other things, on the control program and the AI-based software module AI1 and can be determined by suitable communication protocols and/or interfaces implemented in the data processing device 40 and the control device 50. For example, a REST (Representational State Transfer) interface or a programming-independent interface according to the gRPC (gRPC Remote Procedure Call) protocol may be implemented in the data processing device 40 and the control device 50. However, these measures are known to the person skilled in the art.

The control device 50 is configured in particular to receive the output signals received from the first external data processing device 50 and to transfer them to the control program. In order to be able to control a technical process, such as for example the production machine 170, at least one external output device 200, i.e. in particular an actuator, can be connected to the control device 50, which can be connected to the production machine 170. In the present example, the actuator 200 can be configured as a relay, which can be controlled by the control device 50 in order to be able to guide the production machine 170, if necessary, in particular into a safe state. The actuator 200 can be directly connected to the control device 50. In the present example, the actuator 200 can be connected to the control device 50 via a field bus 110 or via an Ethernet switch (not shown), for example. For this purpose, the control device 50 has a corresponding communication interface 101, for example a fieldbus interface that matches the fieldbus 110. It should be noted that the output device 150 can also be connected to the communication interface 101 of the control device 50, for example via the fieldbus 110 or an Ethernet switch (not shown), provided that the output device 150 has a suitable communication interface.

An exemplary scenario is now described. Assume that, in the manner described above, the surveillance images recorded by the video camera 150 have reached the control unit 50 as video signals and from there to the data processing unit 40. It is also assumed that the video camera 150 has recorded a defective screw. This further means that the output signals obtained by the control unit 41 of the first external data processing device 40 while executing the first AI-based software module and depending on the video signals input to the AI-based software module AI1 reflect the defective screw. Depending on the implementation, the control unit 80 of the control device 50, executing the control program, can evaluate the output signals received from the data processing device 40, which signal a defective screw, and send a corresponding control signal to the actuator 200 via the fieldbus 110. In response to this control signal, the actuator 200 ensures, for example, that the production machine 170 is transferred to a safe state. It is also conceivable that the output signal formed by the data processing device 40 and transmitted to the control device 50 can already be used as a control signal for the actuator 200. In this case, the control unit 80, executing the control program, causes the control device 50 to simply forward the output signal received from the data processing device 40 to the actuator 200 via the field bus 110.

In order to not only carry out a quality control with regard to the manufactured products, but also, for example, to be able to recognize preventive maintenance of the manufacturing machine 170, at least one second external input device 120 can be provided that can be connected to the control device 50 and is configured to transmit sensor signals to the control device 50. The sensor signals are not video and/or audio signals. The input device 120 is preferably a sensor, such as a temperature or vibration sensor, which can also be connected to the control device 50 via the field bus 110. For explanatory purposes only, it is assumed that the sensor 120 is a vibration sensor. The control device 50 can preferably be configured to cyclically or acyclically request the sensor 120 to send sensor signals, for example containing measured values, to it. The control unit 80 of the control device 50 can preferably, while executing the control program, cause the control device 50 to store the sensor signals received via the communication interface 101 as part of a process image in the memory device 95 and send them to the first external data processing device 40. The sensor signals can be transmitted to the data processing device 40 at the same time or with a time delay to the video signals supplied by the video camera 150. Depending on the programming, the first AI-based software module AI1 stored in the first external data processing device 40 may be configured to process input signals that include audio and/or video signals and sensor signals from the sensor 120. In particular, the control unit 41 of the first external data processing device 40 may be configured to process the video signals and/or audio signals received from the control device 50 together with the sensor signals into output signals by executing the first software module AI1 and to cause the first external data processing device 40 to transmit the output signals to the control device 50. It should be noted that, according to the embodiment example described, only video signals from the video camera 150 and no audio signals are transmitted to the data processing device 40. Accordingly, the first AI-based software module AI1 is preferably configured to process input signals that include video signals from the video camera 150 and sensor signals from the sensor 120.

Another exemplary scenario is now described. Assume that the video camera 150 has recorded proper screws, but the vibration sensor 120 has recorded unusual vibrations of the production machine. The corresponding video signals and sensor signals have also already been transmitted from the control device 50 to the data processing device 40. This means that the output signals obtained by the control unit 41 of the first external data processing device 40 while executing the first AI-based software module and depending on the video signals and sensor signals input to the AI-based software module AI1 reflect a deviation from an error-free vibration behavior of the manufacturing machine 170. Depending on the implementation, the control unit 80 of the control device 50 can, while executing the control program, evaluate the output signals received from the data processing device 40, which signal an unusual vibration behavior of the manufacturing machine 170, and send a corresponding control signal via the fieldbus 110 to the actuator 200 and/or generate a warning signal, which signals to an operator that the manufacturing machine 170 requires maintenance. Such a warning signal can, for example, be output visually and/or acoustically directly on the control device 50. Alternatively or additionally, the warning signal can also be transmitted to the external computer 20. If a control signal is generated, the actuator 200 can, for example, respond to the control signal to ensure that the production machine 170 is transferred to a safe state. It is also conceivable that the output signal formed by the data processing device 40 and transmitted to the control device 50 can already be used as a warning signal and/or control signal for the actuator 200. In this case, the control unit 80, executing the control program, causes the control device 50 to output the output signal received from the data processing device 40 as a warning signal and/or to simply forward it to the actuator 200 as a control signal via the field bus 110.

Instead of using an AI-based software module AI1 which is configured to process input signals comprising audio and/or video signals and sensor signals, two different software modules AI1 and AI2, each based on a learned artificial neural network, can be stored in the memory device 42 of the data processing device 40, wherein the AI-based software module AI1 can be configured to process audio and/or video signals, in the present example the video signals of the video camera 150, into output signals, while the AI-based software module AI2 can be configured to process sensor signals, in the present example the sensor signals of the sensor 120, into output signals. In this case, the control device 50 is preferably configured to specifically assign the sensor signals coming from the sensor 120 to the AI-based software module AI2 and the video signals coming from the video camera 150 to the AI-based software module AI1 in such a way that the data processing device 40 is able to process the sensor signals received by the control device 50 into output signals, recognize the sensor signals received from the control device 50 as input signals of the AI-based software module AI2 and the video signals received from the control device 50 as input signals of the AI-based software module AI12 and to feed the video signals and sensor signals to the respective AI-based software module AI1 and AI2. AI2 respectively. The control unit 50 is preferably configured to transfer the output signals received from the data processing unit 40, which have been generated by the two AI-based software modules AI1 and AI2, to the control program for further use, in particular for evaluation and/or processing. In particular, the control unit 80 can generate a control signal for the actuator 200 by executing the control program and depending on the two output signals, with which the production machine 150 can be transferred to a safe state, for example.

For example, in order to be able to monitor two different technical processes or sub-processes, for example the quality of the screws produced by production machine 150 and the wear of a production machine 180, and/or to control the production machines accordingly, a further external input device 190, which can be connected to the control device 50 and is configured to transmit audio and/or video signals to the control device 50, and a further actuator 130 assigned to the production machine 180 can be provided as an output device. For example, the input device 190 is a microphone associated with the production machine 180, which can pick up sounds from the production machine 180 and transmit them as audio signals to the control device 50. As can be seen in FIG. 1 as an example, the microphone 190 can preferably also be connected to the communication interface 101 of the control device 50 via the field bus 110.

For explanatory purposes only, it is initially assumed that the manufacturing machine 170 is only monitored by the video camera 150 and the manufacturing machine 180 is only monitored by the microphone 190. Furthermore, it is assumed that the AI-based software module AI1, which is configured to process the video signals of the video camera 150, and a further software module based on a trained artificial neural network, which is configured to process input signals containing audio and/or video signals, are stored in the memory device 42. In the present case, the further AI-based software module is configured to process the audio signals of the microphone 190. The control device 50 is preferably configured to assign the audio signals received from the input device 190 to the further AI-based software module stored in the first external data processing device 40, and to assign the video signals received from the input device 150 to the first AI-based software module AI1 stored in the first external data processing device 40. One possibility is to include, in each video data packet to be transmitted and in each audio data packet to be transmitted, corresponding information that can be used by the data processing device 40 to provide the respective video signals and audio signals to the respective AI-based software module as input signals. The control unit 80 of the control device 50 is preferably configured to cause the control device 50 to send the video signals received from the input device 150 and the audio signals received from the microphone 190 to the first external data processing device 40 using a communication protocol, wherein the communication protocol includes a protocol for continuous transmission of audio and/or video signals. The communication protocol is implemented both in the control device 50 and in the data processing device 40 as a hardware and/or software component. The control unit 41 of the first external data processing device 40 is preferably configured to i) transfer the audio signals of the microphone 190 received from the control device 50 to the further AI-based software module and the video signals of the video camera 150 to the first AI-based software module AI1 as input signals, ii) to process by executing the first AI-based software module AI1 the video signals into first output signals and to process by executing the further AI-based software module the audio signals into second output signals, and iii) to cause the first external data processing device 40 to transmit the first and second output signals to the control device 50.

It should be noted that the first AI-based software module AI1 has preferably been trained to recognize whether the image information contained in the video signals of the video camera 150 corresponds to a predetermined pattern. Similarly, the further AI-based software module may in particular have been trained to recognize whether the acoustic information contained in the audio signals of the microphone corresponds to a predetermined pattern. If the processed video or audio signals deviate from the predetermined patterns, this deviation is reflected accordingly in the output signals of the first and further AI-based software module.

The control device 50 is configured to receive the first and second output signals transmitted by the first external data processing device and to transfer them to the first control program for further use, in particular for evaluation and/or processing. Alternatively, only the first output signals can be transferred to the first control program and the second output signals can be transferred to another control program stored in the memory device 90 of the control unit 50 for further use, in particular for evaluation and/or processing. In particular, the control unit 80 can generate a control signal for the actuator 200 and a control signal for the actuator 130 by executing the first control program and depending on the first and second output signals, with which the production machine 150 or the production machine can be transferred to a safe state, for example. This is the case, for example, if a defective screw has been recorded by the video camera 150 and a noise indicating wear of the production machine 180 has been recorded by the microphone 190.

In order to be able to reliably detect pending maintenance of the production machine 180, at least one further sensor 121, for example a temperature sensor, can be assigned to the production machine 180. The sensor 121 can also be connected to the control device 50 via the field bus 110. As already described above, the sensor 120 can also be assigned to the production machine 170. The exemplary mode of operation and exemplary implementations of the control and data transmission device 10 have already been explained in detail above with regard to the manufacturing machine 170 in conjunction with the actuator 200, the video camera 150 and the sensor 120. Similarly, the sensor signals from the sensor 121 and the audio signals from the microphone 190 could be transmitted to the control device 50 and then specifically from there to the data processing device 50. If the further AI-based software module is configured to process both the sensor data of the sensor 121 and the audio signals of the microphone 190 as input signals, the data processing device 40 transmits both the sensor data of the sensor 121 and the audio signals of the microphone 190 to the further AI-based software module. Furthermore, it should be noted that the sensor data of the sensor 121 and the output data intended for the actuator 130 can be stored as a further process image in the memory device 50.

Instead of storing only in the one data processing device 40 several software modules, each based on a trained artificial neural network, which are configured to process input signals, which preferably include audio and/or video signals, several data processing devices can be connected to the control device 50 by means of a direct connection, in each of which at least one software module based on a trained artificial neural network can be stored, preferably as a tflite file.

Figure 2:
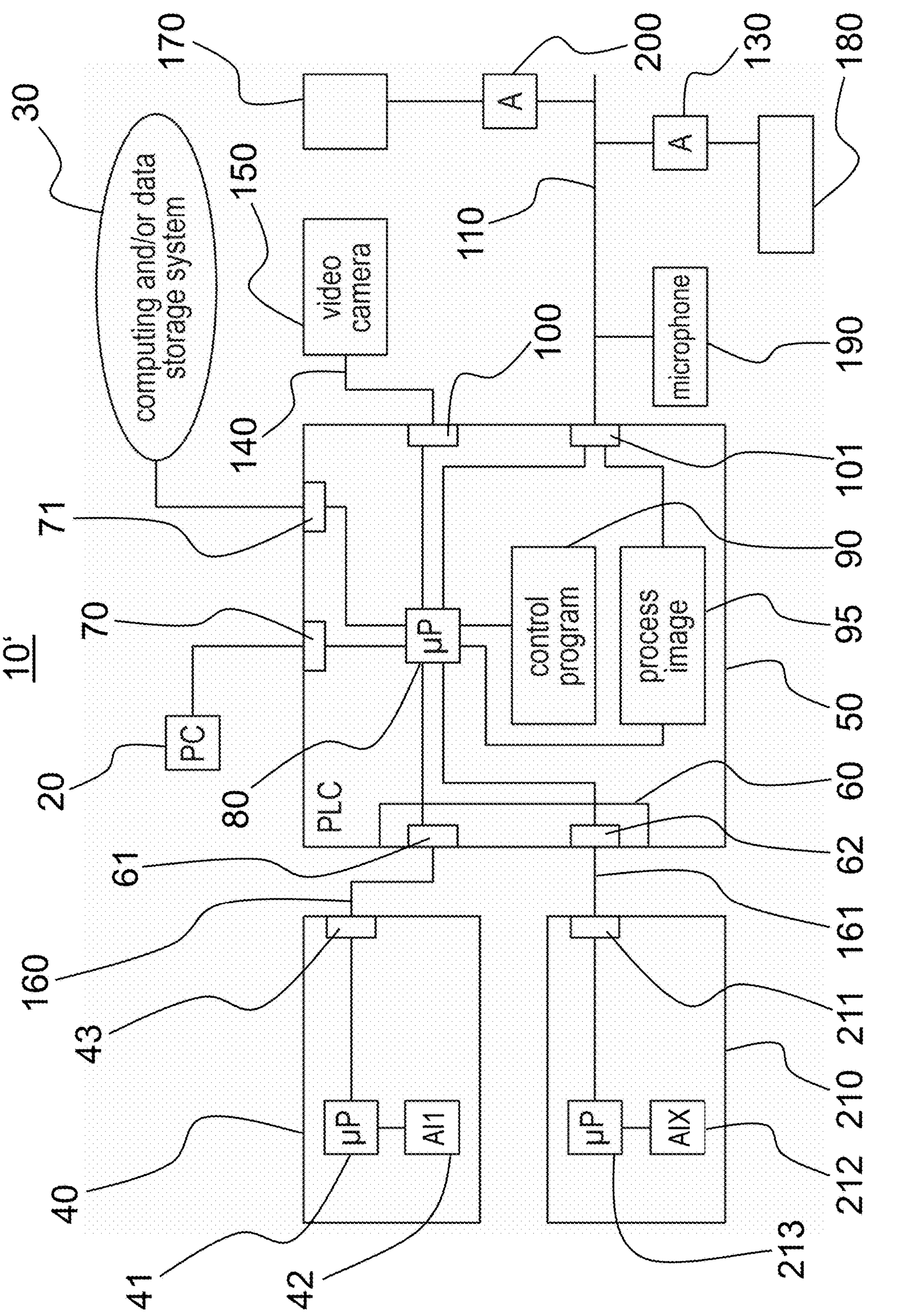
FIG. 2 shows another exemplary control and/or data transmission system with a PLC and two external data processing devices directly connected to the PLC.

FIG. 2 shows an exemplary control and data transmission system 10' with two data processing devices 40 and 210. Since the control and data transmission system 10' differs from the system 10 shown in FIG. 1 essentially only by the added data processing device 210, the reference signs of the control and data transmission system 10 shown in FIG. 1 have been adopted. Similar to the data processing device 40, the data processing device 210 has a control unit 213, which can be configured as a microprocessor or microcontroller, and a memory device 212 connected to the control unit. For explanatory purposes only, it is assumed that the two sensors 120 and 121 shown in FIG. 1 are not used in the control and data transmission system 10'.

As can be seen in FIG. 2, the control device 40 is now connected to the second data processing device 210 via a second direct connection 161. The second direct connection 161, which in turn may comprise a multi-core cable, is terminated on the control device 50, for example, by the second connection point 62 or the second lane of the communication interface 60 and on the second data processing device 210 by a communication interface 211. As already mentioned above, the communication interface 60 is preferably configured as a PCI Express interface. Accordingly, the communication interface 211 of the second data processing device 210 is also preferably configured in accordance with the PCI Express standard.

For explanatory purposes only, it is assumed that the manufacturing machine 170 is only monitored by the video camera 150 and the manufacturing machine 180 is only monitored by the microphone 190. It is further assumed that the AI-based software module AI1, which is configured to process the video signals of the video camera 150, is stored in the memory device 42 of the first data processing device 40, and a software module AIX based on a trained artificial neural network, which is configured to process input signals comprising audio and/or video signals, is stored in the memory device 212 of the second data processing device 210. In the present case, the further AI-based software module is configured to process the audio signals of the microphone 190. The control device 50 is preferably configured to assign the audio signals received from the input device 190 to the AI-based software module AIX stored in the second external data processing device 40, and to assign the video signals received from the input device 150 to the first AI-based software module AI1 stored in the first external data processing device 40. In other words. The control device 50 is configured such that video signals from the video camera 150 are to be transmitted to the data processing device 40 via the connection point 61 of the communication interface 60, and audio signals from the microphone 190 are to be transmitted to the data processing device 210 via the connection point 62 of the communication interface 60. The control unit 80 of the control device 50 is preferably configured to cause the control device 50 to transmit the video signals received from the input device 150 to the first external data processing device 40 using a communication protocol and to transmit the audio signals received from the input device 190 to the second external data processing device 210 using a communication protocol, wherein the communication protocols each include a protocol for continuous transmission of audio and/or video signals. The communication protocol is implemented as a hardware and/or software component in the control unit 50 as well as in the data processing devices 40 and 210.

The control unit 41 of the first external data processing device 40 is preferably configured to transfer the video signals of the video camera 150 received from the control device 50 to the AI-based software module AI1 as input signals, to process the video signals into first output signals while executing the first AI-based software module AI1 and to cause the first external data processing device 40 to transmit the first output signals to the control device 50.

The control unit 213 of the second external data processing device 210 is preferably configured to transfer the audio signals of the microphone 190 received from the control device 50 to the AI-based software module AIX as input signals, to process the audio signals into second output signals while executing the AI-based software module AIX, and to cause the second external data processing device 210 to transmit the second output signals to the control device 50.

It should be noted that the first AI-based software module AI1 has preferably been trained to recognize whether the image information contained in the video signals of the video camera 150 corresponds to a predetermined pattern. Similarly, the further AI-based software module AIX has preferably been trained to recognize whether the acoustic information contained in the audio signals of the microphone corresponds to a predetermined pattern. If the processed video or audio signals deviate from the predetermined patterns, this deviation is reflected accordingly in the respective output signals of the AI-based software modules AI1 and AIx.

The control device 50 is configured to receive the first output signals sent by the first external data processing device 40 and the second output signals sent by the second external data processing device 210 and to transfer them to the first control program for further use, in particular for evaluation and/or processing. Alternatively, only the first output signals can be transferred to the first control program and the second output signals can be transferred to another control program stored in the memory device 90 of the control device 50 for further use, in particular for evaluation and/or processing. In particular, the control unit 80 can generate a control signal for the actuator 200 and a control signal for the actuator 130 by executing the first control program and depending on the first and second output signals, with which the production machine 150 or the production machine can be transferred to a safe state, for example. This is the case, for example, if a defective screw has been recorded by the video camera 150 and a noise indicating wear of the production machine 180 has been recorded by the microphone 190.

The control and/or data transmission systems 10 and 10' can each have a higher-level, preferably cloud-based computing and/or data storage system 30, which can be connected to the control device 50. For this purpose, the control device 50 can have a further communication interface 71 via which the control device 50 can send the output signals received from the data processing device 40 and/or the data processing device 210 to the higher-level computing and/or data storage system 30, preferably by means of IP packets. In this way, the output signals of the AI-based software modules AI1 and AI2 executed by the control unit 41 of the data processing device 40 and/or the output signals of the AI-based software modules AI1 and AIX executed by the control unit 213 of the data processing device 210 can be collected, viewed and, if necessary, used to optimize the respective AI-based software modules. It is conceivable that the output signals stored in the higher-level computing and/or data storage system 30 can be queried by the computer 20. In this way, the AI-based software modules AI1 and AI2 and AIX, which may have been created and trained on the computer, can be further trained and optimized. The optimized AI-based software modules can then be transferred, for example, as a tflite file via the control device 50 to the data processing device 40 or to the data processing device 210, where they overwrite or replace the old AI-based software modules.

The invention claimed is:

1. A control and/or data transmission system comprising:

a control device having:

a memory device in which a control program is stored, and a control unit connected to the memory device and configured to execute the control program, a first external input device connectable to the control device, the first external input device being configured to transmit audio and/or video signals to the control device, the control device being configured to receive audio and/or video signals from the first external input device, and a first external data processing device having a control unit and a memory device connected to the control unit, in which a first software module based on a trained artificial neural network is stored, the first software module being configured to process input signals containing audio and/or video signals, wherein the first external data processing device and the control device can be connected to one another by means of a first direct connection, wherein the control unit of the control device is configured to cause the control device to send the audio and/or video signals received from the first external input device to the first external data processing device using a communication protocol, wherein the communication protocol includes a protocol for continuous transmission of audio and/or video signals, wherein the first external data processing device is configured to receive the audio and/or video signals sent from the control device according to the communication protocol, wherein the control unit of the first external data processing device is configured to process the audio and/or video signals received from the control device into output signals by executing the first software module and to cause the first external data processing device to transmit the output signals to the control device, and wherein the control device is configured to receive the output signals sent by the first external data processing device and to transfer them to the control program.

2. The control and/or data transmission system according to claim 1, wherein:

the communication protocol contains the Real-Time Streaming Protocol (RTSP).

3. The control and/or data transmission system according to claim 1, further comprising:

a second external input device connectable to the control device and is configured to transmit sensor signals to the control device, the control device being configured to receive sensor signals from the second external input device, wherein the control unit of the control device is configured to cause the control device to transmit the sensor signals received from the second external input device to the first external data processing device, the first external data processing device being configured to receive the sensor signals transmitted by the control device, wherein the first software module stored in the first external data processing device is configured to process input signals containing audio and/or video signals and sensor signals, wherein the control unit of the first external data processing device being configured by executing the first software module to process the audio and/or video signals received from the control device together with the sensor signals into output signals and to cause the first external data processing device to transmit the output signals to the control device, and wherein the control device is configured to receive the output signals sent by the first external data processing device and to transfer them to the control program.

4. The control and/or data transmission system according to claim 1, further comprising:

a third external input device connectable to the control device, the third external input device being configured to transmit audio and/or video signals to the control device, wherein the control device is configured to receive audio and/or video signals from the third external input device, a second external data processing device comprising a control unit and a memory device connected to the control unit, wherein a second software module based on a trained artificial neural network is stored in the memory device, the second software module being configured to process input signals, which contain audio and/or video signals, the second external data processing device and the control device being connectable to one another by means of a second direct connection, the control unit of the control device being configured to cause the control device to send the audio and/or video signals received from the third external input device to the second external data processing device using a communication protocol, wherein the communication protocol comprises a protocol for continuous transmission of audio and/or video signals, wherein the second external data processing device is configured to receive the audio and/or video signals of the third external input device sent by the control device according to the communication protocol, wherein the control unit of the second external data processing device is configured to process the audio and/or video signals received from the control device into output signals by executing the second software module, and to cause the second external data processing device to transmit the output signals to the control device, and wherein the control device is configured to receive the output signals transmitted by the second external data processing device and to transfer them to the control program or to a further control program stored in the memory device of the control device.

5. The control and/or data transmission system according to claim 4, further comprising:

a higher-level computing and/or data storage system which is connectable to the control device, wherein the control device is configured to send output signals received from the first data processing device to the higher-level computing and/or data storage system, and wherein the control device is configured to send output signals, which it has received from the second data processing device, to the higher-level computing and/or data storage system.

6. The control and/or data transmission system according to claim 1, further comprising:

a third external input device connectable to the control device, the third external input device being configured to transmit audio and/or video signals to the control device, the control device being configured to receive audio and/or video signals from the third external input device, wherein a third software module based on a trained artificial neural network is stored in the first external data processing device, the third software module being configured to process input signals containing audio and/or video signals, wherein the control device is configured to assign the audio and/or video signals received from the third external input device to the third software module stored in the first external data processing device, wherein the control unit of the control device is configured to cause the control device to send the audio and/or video signals received from the third external input device to the first external data processing device using a communication protocol, the communication protocol including a protocol for continuous transmission of audio and/or video signals, wherein the control unit of the first external data processing device is configured to i) transferring the audio and/or video signals received from the control device, which originate from the third external input device, to the third software module as input signals, ii) processing these input signals into output signals while executing the third software module, and iii) causing the first external data processing device to transmit the output signals of the third software module to the control device, and wherein the control device is configured to receive the output signals of the third software module transmitted by the first external data processing device and to transfer them to the control program or to another control program stored in the memory device of the control device.

7. The control and/or data transmission system according to claim 1, further comprising:

a higher-level computing and/or data storage system which is connectable to the control device, wherein the control device is configured to send output signals received from the first data processing device to the higher-level computing and/or data storage system.

8. The control and/or data transmission system according to claim 7, wherein:

the higher-level computing and/or data storage system is a cloud-based system.

9. The control and/or data transmission system according to claim 1, wherein:

at least one external output device connectable to the control device, and wherein the control device is configured to control the external output device in dependence of the output signals received from the first external data processing device and by executing the stored control program.

10. The control and/or data transmission system according to claim 1, wherein:

the control device is configured to receive a software module based on a trained artificial neural network, the software module being configured to process input signals comprising audio and/or video signals and being storable in an external computer connectable to the control device, and to send the received software module to the first external data processing device.

11. The control and/or data transmission system according to claim 1, wherein:

the control device is a programmable logic controller.

12. The control and/or data transmission system according to claim 1, wherein:

the control and/or data transmission system is an industrial automation system.

13. The control and/or data transmission system according to claim 1, wherein:

the control unit of the control device is configured to cause the control device to monitor and/or control and/or regulate a technical process while executing the control program.

* * * * *